United States Patent Office 3,355,863
Patented Dec. 5, 1967

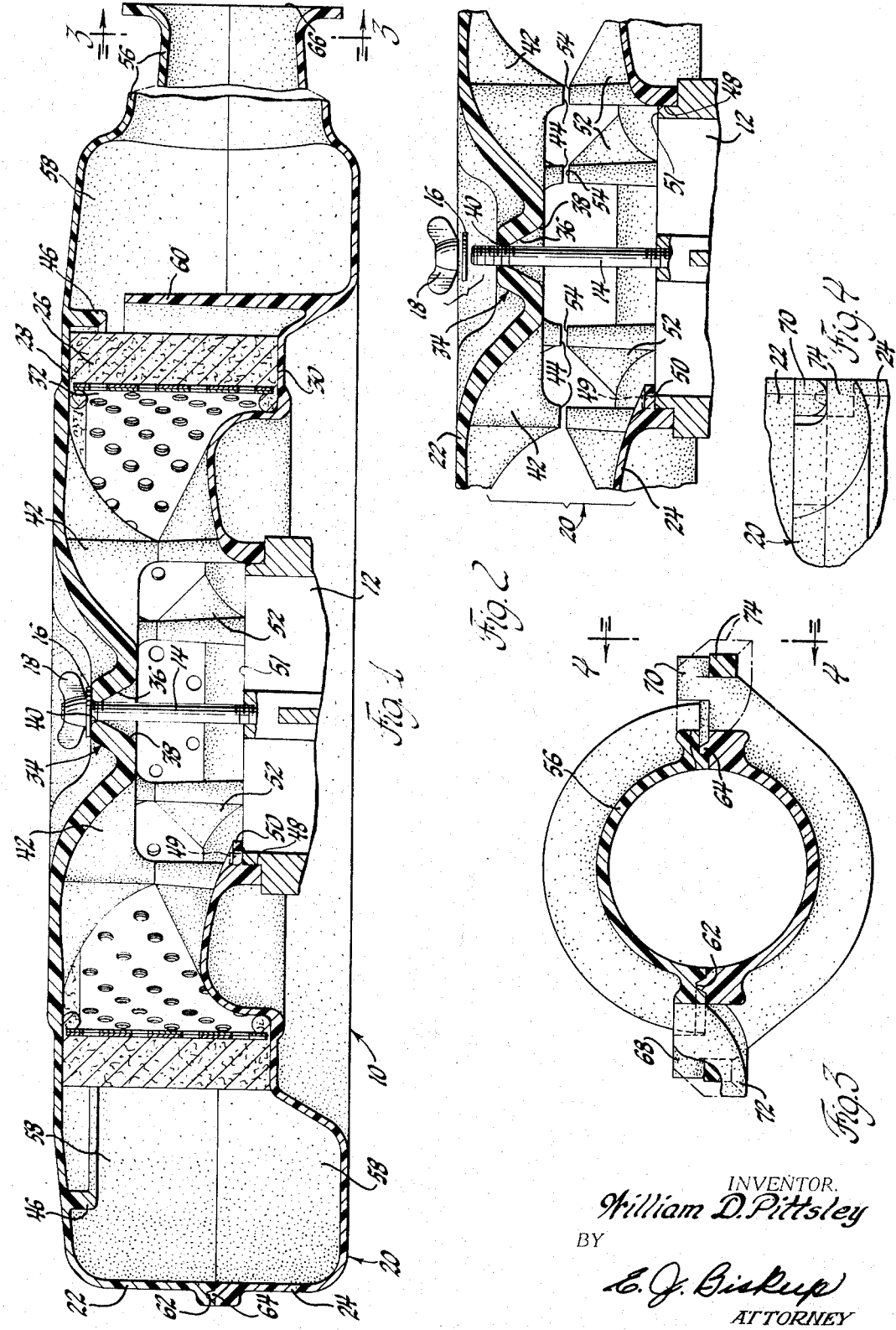

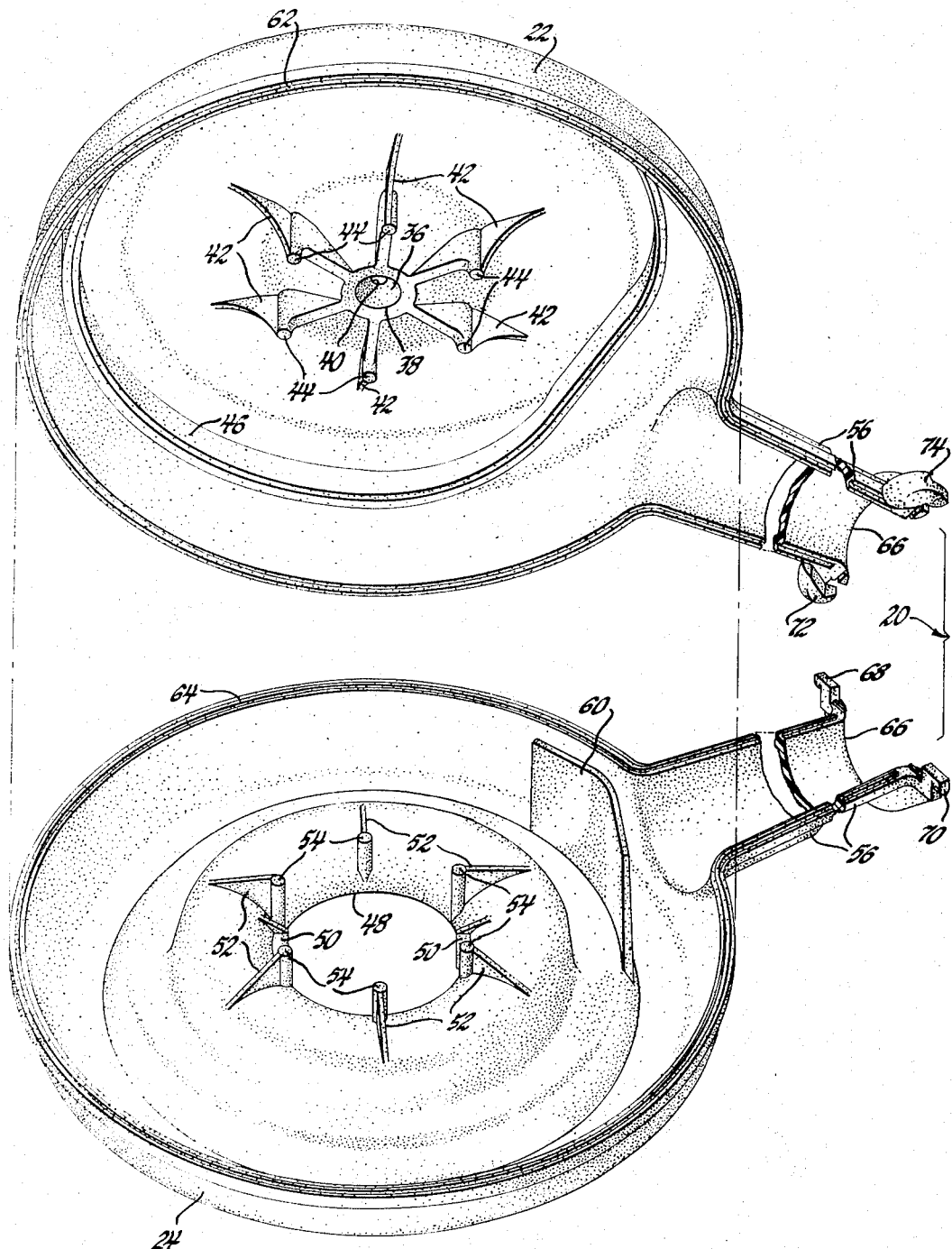

3,355,863
AIR CLEANER AND SILENCER ASSEMBLY
William D. Pittsley, Flint, Mich., assignor to General Motors Corporation, Detroit, Mich., a corporation of Delaware
Filed Mar. 8, 1966, Ser. No. 532,758
3 Claims. (Cl. 55—276)

ABSTRACT OF THE DISCLOSURE

An air cleaner and silencer assembly formed as a two-part plastic assembly consisting of an upper housing member and a lower housing member. Each of the members have mating surfaces contacting each other for providing a seal therebetween whereby air into and from the assembly is limited to the air inlet and air outlet formed in the housing. The assembly also has the air inlet formed as a tube, a portion of which is integral with both the upper and lower housing members.

---

This invention relates to an air cleaner and silencer assembly for an internal combustion engine and more particularly to a novel housing for the air cleaner silencer assembly.

The metal housings of air filters presently used in the industry require several operations in the forming of the housing and assembly thereof. The present air cleaner housing is designed to be integrally molded as a two-part assembly having a simple interlocking means, an integrally formed support bridge, stud pilot and seal.

An object of this invention is to provide a housing for an air cleaner silencer having integral locking means formed thereon for securing the two parts of the housing together and a support means for positioning and securing the housing on the intake port of an internal combustion engine.

Another object of this invention is to provide an integral sealing means between the two parts of the housing which consists of a sealing cavity or groove in one portion of the housing and a sealing bridge or tongue in the other portion of the housing for cooperating with the cavity for sealing escape of air from within the housing and preventing indraft of dirt from without the housing.

Another object of this invention is to provide integrally cast support bridges in each housing portion which will cooperate in the assembled position to provide a rigid connection to the air intake port of the engine and also provide support for the housing itself.

A further object of this invention is to provide an integrally cast annular vertical baffle in the upper portion of the housing for stabilizing air flow within the housing and preventing restriction flow therein.

Another object of this invention is to provide an integrally cast baffle in a lower portion of the housing for preventing direct impingement of incoming air on the filter element and for channelling the air in a circular motion about the filter element.

These and other objects of the invention will become more apparent as reference is had to the following specification and the drawings wherein:

FIGURE 1 is a sectional view, with portions cut away, of an air cleaner silencer unit mounted on the air inlet of an internal combustion engine and utilizing the novel housing with the integrally cast support bridges and locking means.

FIGURE 2 illustrates a portion of FIGURE 1 showing the support bridge, mounting stud, washer and wing nut prior to assembly.

FIGURE 3 is a view substantially along the line 3—3 of FIGURE 1, in the direction of the arrows, showing the integral locking means for securing the end of the snorkel tube in the assembled position.

FIGURE 4 is a view substantially along the line 4—4 of FIGURE 3, in the direction of the arrows, showing a side view of the snorkel tube interlocking means.

FIGURE 5 is an exploded view in perspective of the mating members of the air cleaner-silencer assembly housing incorporating the present invention.

Referring now to the drawings, as best seen in FIGURE 1, an air cleaner and silencer assembly indicated generally by the numeral 10 is shown mounted on an air intake port 12 such as is commonly found on an internal combustion engine. A mounting stud 14 is secured to the air intake port 12 and extends therefrom for securing the air cleaner and silencer assembly 10 on the air intake port by means of a washer 16 and wing nut 18.

The air cleaner and silencer assembly 10 includes a housing 20 consisting of an upper housing member 22 and a lower housing member 24. Positioned between the housing members 22 and 24 is an annular air filter element 26 of conventional design. In the assembled position, the air filter element 26 has one edge 28 sealed against the upper housing member 22 and the other edge 30 sealed against the lower housing member 24. The filter element 26 may be formed of any suitable material, such as polyurethane foam. Within filter element 26 is a support means 32 which provides the necessary stiffening for the filter element 26.

Referring now to FIGURE 5, the housing 20 is preferably fabricated from an inexpensive material, such as a phenolic resin, that may be easily formed as by thermal compression molding. The housing could also be manufactured by zinc or aluminum die casting, if desired.

The upper housing member 22 is provided with a centrally positioned stud pilot 34 which has a tapered wall 36 extending from a larger opening 38 inside of the housing 22 to the outside thereof and terminating in a smaller aperture 40 in which the stud 14 is positioned for mounting the air cleaner and silencer assembly on the air intake port 12. Extending radially from the stud pilot 34 are a plurality of support bridges 42 which terminate in individual support pads 44. All the support pads 44 of the upper housing member 22 are in substantially the same plane. A vertical baffle 46 extends inwardly from the inner surface of the upper housing member 22 and is spaced outwardly from the air filter element for stabilizing the air flow and preventing restriction float.

The lower housing member 24 has a central aperture 48 which serves as the outlet port for the assembly. A pair of locating tabs 50 are formed in the central aperture 48. Each of the tabs 50 is adapted to be located between pairs of circumferentially spaced tabs 49 projecting from the terminating edge 51 of the air intake port 12 so as to prevent rotation of the air cleaner housing on the air intake port 12 after the housing is secured thereon by tightening wing nut 18.

A plurality of support bridges 52 extend radially from the central aperture 48 and terminate in individual support pads 54. The upper support pads 44 and lower support pads 54 are located in their respective housing members for contacting each other when the housing 20 is in assembled position.

When the housing 20 is in the assembled position, as seen in FIGURE 1, a circular snorkel tube 56 is formed by the housing members 22 and 24 which communicates with an annular contaminated air chamber 58 encircling the filter element 26. The snorkel tube 56 admits contaminated air into the filter housing and reduces the noise caused by such air movement in a conventional manner.

A deflector plate 60 extends from the lower housing member toward the upper housing member for deflecting incoming contaminated air from direct impingement on the filter element 26 and for directing the flow of air within the contaminated air chamber 58.

To provide an air tight seal between the upper and lower housing members 22, 24, in assembled position, a tongue and groove type joint is provided for the mating edges. The mating edge of the upper housing 22 is formed with a groove 62 and the mating edge of the lower housing 24 is formed with a tongue 64.

Referring to FIGURES 3–5, when the upper and lower housing members 22, 24 are secured together in the assembled position on the air intake port 12, a fork and pin lock integrally formed on the air intake end 66 of the snorkel tube 56 is used to align and secure the end of the snorkel tube extensions of the housing members 22, 24. The fork and pin lock includes a pair of pins 68, 70 on the lower housing 24 and a pair of cooperating forks 72, 74 on the upper housing 22.

To assemble the housing 20, as shown in FIGURE 1, the filter element 26 and support means 32 are positioned in the lower housing member 24. Then the forks 72, 74 of the upper housing 22 are rotated into position about the pins 68, 70 of the lower housing 24. As the forks 72, 74 seat about the pins 68, 70 the tongue 64, on the mating edge of the lower housing member 24, engages the groove 62 of the mating edge of upper housing member 24 and the upper housing member contacts the upper edge 28 of the filter element 26.

At this stage in the assembly process, the support pads 44 of the upper housing member and the support pads 54 of the lower housing member are in a spaced relation, as shown in FIGURE 2. The housing is placed on the intake port 12 by passing the bolt 14 through the outlet aperture 48 and the stud pilot 34 until the tabs 50 contact the edge 51 and then the washer 16 and wing nut 18 are placed over the exposed end of the bolt 14. As the wing nut 18 is threaded on the bolt 14, a compressive force is exerted on the housing members between the washer 16 and the intake port 12 until the support pads 44 and 54 come into contact, as seen in FIGURE 1, thus providing a rigid housing for the air cleaner and silencer assembly. The movement of the upper and lower housing members towards each other also exerts a pressure on the ends 28 and 30 of the filter element 26 to secure it in an air tight contact with each of the housing members. Further, the compressive forces urging the housing members together also brings the tongue 64 into tight contact with the groove 62 along the entire mating edge of the housing members.

Thus, it can be seen that a compact, easily assembled air filter cleaner housing is provided wherein the air filter may be inserted and the housing members joined together by the simple operation of the tightening of the wing nut on the assembly.

It is to be understood that the invention is not intended to be limited in its application to the exact details of construction and arrangement of parts as illustrated in the accompanying drawings since the invention is capable of other embodiments and of being practiced and carried out in various ways. It is, therefore, comprehended that the various modifications may be made within the scope of the invention as defined by the following claims.

I claim:

1. An air cleaner and silencer assembly for an internal combustion engine having an air intake port provided with an upstanding stud, comprising a plastic housing having an air inlet and an air outlet the latter of which registers with said air intake port, an air filter element positioned in said housing between said air inlet and air outlet, said housing comprising an upper housng member and a lower housing member, a mating surface on each of said members for contacting each other to form said housing, sealing means on said mating surfaces, said sealing means including a groove formed on said mating surface of one of said members, a tongue formed on said mating surface of the other of said members for cooperating with said groove for providing a seal at the mating surfaces of said members whereby movement of air into and from said assembly is limited to said air inlet and said air outlet, a pilot aperture centrally located in said upper housing member for accommodating said stud, locking means for holding said mating surfaces of said members together for forming said housing and effectively maintaining said sealing means, and said air inlet taking the form of a tube and being formed by an integral portion of both the upper housing member and the lower housing member when said two members are held together by said locking means, said locking means including a fork keeper on the inlet tube forming portion of one of said members and a lock pin on the inlet tube forming portion of the other of said members and cooperating with said fork keeper by securing said housing members together to form said housing.

2. An air cleaner and silencer assembly for an internal combustion engine having an air intake port provided with an upstanding stud, comprising a plastic housing having an air inlet and an air outlet the latter of which registers with said air intake port, an air filter element positioned in said housing between said air inlet and air outlet, said housing comprising an upper housing member and a lower housing member, a mating surface on each of said members for contacting each other to form said housing, sealing means on said mating surfaces, said sealing means including a groove formed on said mating surface of one of said members, a tongue formed on said mating surface of the other of said members for cooperating with said groove for providing a seal at the mating surfaces of said members whereby movement of air into and from said assembly is limited to said air inlet and said air outlet, a pilot aperture centrally located in said upper housing member for accommodating said stud, a plurality of support bridges extending radially from said pilot aperture in said upper housing member and from said air outlet in said lower housing member, each of said support bridges having a support pad, the support pads formed with the support bridges of the upper housing member and the lower housing members contacting each other for providing a rigid internal support for said assembly, locking means for holding said mating surfaces of said members together for forming said housing and effectively maintaining said sealing means, and said air inlet taking the form of a tube and being formed by an integral portion of both the upper housing member and the lower housing member when said two members are held together by said locking means.

3. The apparatus as claimed in claim 2 wherein said locking means includes a fork keeper on one of said members and a lock pin on the other of said members for cooperating with said fork keeper for securing said housing members together to form said housing.

References Cited

UNITED STATES PATENTS

| | | | |
|---|---|---|---|
| 2,150,745 | 3/1939 | Mieras et al. | |
| 2,764,142 | 9/1956 | McMullen. | |
| 2,906,370 | 9/1959 | McMullen et al. | 55—276 |
| 2,954,091 | 9/1960 | McMichael | 55—510 X |
| 2,966,960 | 1/1961 | Rochlin | 55—509 X |
| 2,996,145 | 8/1961 | Thornburgh | 55—498 |
| 2,999,562 | 9/1961 | Lechtenberg | 55—504 X |
| 3,002,870 | 10/1961 | Belgarde et al. | |
| 3,039,254 | 6/1962 | Thornburgh | 55—276 |
| 3,130,025 | 4/1964 | Bowden et al. | 55—510 X |
| 3,212,242 | 10/1965 | Florine | 55—510 |
| 3,218,785 | 11/1965 | Tietz | 55—503 |

HARRY B. THORNTON, *Primary Examiner.*

D. TALBERT, *Assistant Examiner.*